UNITED STATES PATENT OFFICE.

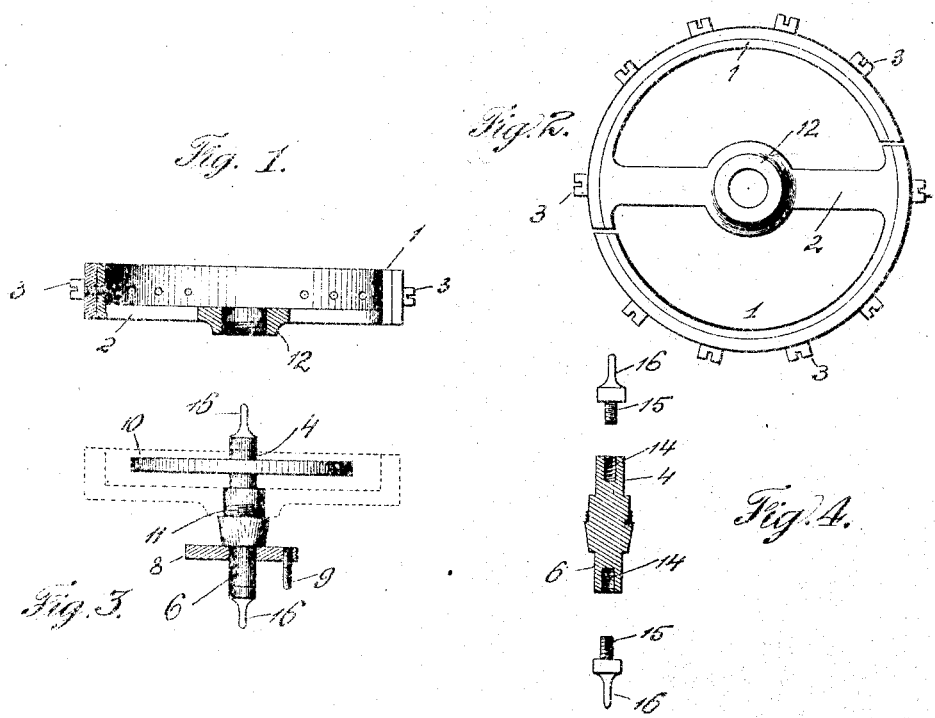

JOHN PORÚBA, OF ALLEGHENY, PENNSYLVANIA.

BALANCE-WHEEL FOR WATCHES.

No. 884,852.  Specification of Letters Patent.  Patented April 14, 1908.

Application filed September 16, 1907. Serial No. 393,083.

*To all whom it may concern:*

Be it known that I, JOHN PORÚBA, a subject of the Emperor of Austria-Hungary, residing at Allegheny, in the county of Allegheny and State of Pennsylvania, have invented certain new and useful Improvements in Balance-Wheels for Watches, of which the following is a specification, reference being had therein to the accompanying drawing.

This invention relates to balance wheels for watches, and the invention has for its object to provide a novel spindle or rotating center for a balance wheel having detachable bearings or points.

Considerable trouble has heretofore been experienced when watches or similar time instruments have been injured by the displacement of balance wheels. It is a well-known fact that a watch injured by falling ordinarily displaces the bearing points of a balance wheel, injuring the said points and requiring the removal of the balance wheel spindle. In this operation the balance wheel proper and the hair spring thereof are ordinarily broken, due principally to the difficult operation of removing a spindle from a balance wheel, it requiring considerable skill to successfully perform such an operation. It is either the rim of the balance wheel, the spider thereof, or the hair spring that is injured when removing the spindle from a balance wheel. In view of these accidents my invention aims to obviate the above defects by providing a balance wheel having detachable bearings or points, which can be easily and quickly removed without injuring the structural elements of the balance wheel.

The invention in its broadest aspect comprehends a balance wheel frame having an interiorly threaded spider support for a spindle, which carries detachable bearings or points.

The detail construction entering into the invention will be presently described and then specifically pointed out in the appended claims.

In the drawings: Figure 1 is a cross sectional view of the balance wheel constructed in accordance with my invention, Fig. 2 is a plan of the same, Fig. 3 is an elevation of my improved spindle, illustrating the balance wheel in dotted lines, and Fig. 4 is a vertical sectional view of the spindle and illustrating the detachable bearings or points thereof.

To obviate the necessity of removing the spindle of a balance wheel when either or both of the bearings thereof has or have become damaged, I have devised a simple and inexpensive spindle, the latter is provided with a hub portion of two different diameters, that portion of larger diameter being indicated by the reference character 10ª and the portion of smaller diameter by the reference character 11, that portion of smaller diameter is screw-threaded and the shoulder formed between the portions 10ª and 11 of the spindle is indicated by the reference character 11ª. The shoulder 11ª constitutes a seat for the depending boss 12 of the spider or brace 2 of a balance wheel 1. The boss 12 has the inner face thereof screw-threaded as at 12ª for engagement with the threads of that portion 11 of the spindle. The opening 12ᵇ formed in the spider frame or brace 2 which forms a continuation of the opening to the boss 12 does not have the wall thereof screw-threaded. The spindle is formed with an upper and a lower shank 4—6 respectively. The upper shank 4 and the lower shank 6 thereof with threaded sockets 14 for the threaded stems 15 of detachable bearings or points 16. I intend to construct the threaded stems 15 of approximately the same diameter as the screws 3, whereby the bearings or points can be readily, if not more easily and quickly detached than the screws 3. It is therefore evident from the novel construction of the spindle illustrated in Fig. 4, that it will not be necessary to remove the spindle from the balance wheel unless the spindle proper has been injured. When only the bearings or points thereof have been injured, these bearings or points can be easily and quickly removed and replaced by perfect bearings or points. The body of the balance wheel is therefore not subjected to a handling that may cause injury, and besides the protection of the balance wheel, I reduce the time to a minimum heretofore necessary for repairing the balance wheel of a watch, or similar piece of mechanism.

From the foregoing description, it will be observed that my invention resides principally in the spindle of a balance wheel, and in the novel manner of detachably mounting the same in the balance wheel, and providing the same with removable bearings or points.

It is thought that the invention will be fully understood from the above description, and in conclusion of said description, I desire to call attention to the fact that such changes in the structural details of my invention as are permissible by the appended claims can be resorted to without departing from the spirit and scope of the invention.

Having now described my invention what I claim as new, is:—

A balance wheel embodying a spider frame having a centrally arranged opening and a depending hollow boss, the inner face of the boss forming a continuation of the wall of said opening, the inner face of the boss being screw-threaded and the wall of said opening being uninterrupted, a spindle having a hub portion of two different diameters thereby forming a shoulder, said shoulder constituting the seat for the lower edge of the boss, that part of the hub portion of smaller diameter and in close proximity to the shoulder being provided with threads, the remainder of that part of the hub of smaller diameter having its periphery uninterrupted, said spindle further embodying a pair of shanks, the diameter of said shanks being the same and the diameter of each of the shanks being the same throughout, each of said shanks having a screw threaded socket, and detachable bearings engaging in said sockets.

In testimony whereof I affix my signature in the presence of two witnesses.

JOHN PORUBA.

Witnesses:
 GEO. A. YOUNG,
 A. H. RABSAIG.